United States Patent
Holly et al.

(10) Patent No.: US 10,046,404 B2
(45) Date of Patent: Aug. 14, 2018

(54) WORKPIECE GUARD AND BLADE GUARD FOR BAND SAW

(71) Applicant: Milwaukee Electric Tool Corporation, Brookfield, WI (US)

(72) Inventors: Jeffrey Holly, West Bend, WI (US); Jeffrey M. Wackwitz, Pewaukee, WI (US); Scott D. Bublitz, Hartland, WI (US); Steven W. Hyma, Milwaukee, WI (US); Kurt Limberg, Milwaukee, WI (US); John G. Marx, Hartford, WI (US); Ryan J. Denissen, Sussex, WI (US); John S. Scott, Brookfield, WI (US); Richard J. LaSota, Pewaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 181 days.

(21) Appl. No.: 14/966,665

(22) Filed: Dec. 11, 2015

(65) Prior Publication Data
US 2016/0096229 A1 Apr. 7, 2016

Related U.S. Application Data

(60) Continuation of application No. 14/193,457, filed on Feb. 28, 2014, now Pat. No. 9,227,255, which is a
(Continued)

(51) Int. Cl.
*B23D 53/12* (2006.01)
*B27G 19/06* (2006.01)
(Continued)

(52) U.S. Cl.
CPC ............ *B23D 53/12* (2013.01); *B23D 55/02* (2013.01); *B23D 59/006* (2013.01); *B27G 19/06* (2013.01); *Y10T 83/613* (2015.04); *Y10T 83/619* (2015.04)

(58) Field of Classification Search
CPC ...... B23D 53/12; B23D 55/20; B23D 59/006; B27G 19/06; Y10T 83/613; Y10T 83/619
See application file for complete search history.

(56) References Cited

U.S. PATENT DOCUMENTS

| 2,032,233 A | 2/1936 | Tautz |
| 2,596,081 A | 5/1952 | Sacrey |

(Continued)

FOREIGN PATENT DOCUMENTS

| CN | 103038013 | 4/2013 |
| DE | 19614608 | 10/1997 |

(Continued)

OTHER PUBLICATIONS

English translation of DE 196 14 608, patent date: Oct. 1997.*
European Patent Office Examination Report for Application No. 11790494.6 dated Dec. 12, 2016 (5 pages).

*Primary Examiner* — Hwei C Payer
(74) *Attorney, Agent, or Firm* — Michael Best & Friedrich LLP

(57) ABSTRACT

A hand-held band saw for cutting a workpiece. The hand-held band saw includes a deck, first and second wheels coupled to the deck for receiving a continuous blade thereabout, a motor coupled to the deck for driving at least one of the first or second wheels, and a handle providing a grip for a user to hold the band saw. The band saw also includes a blade guard having a first portion adjacent the first wheel, a second portion adjacent the second wheel, and a third portion adjoining the first and second portions. A joint couples the first, second, and third portions to the deck for
(Continued)

simultaneous movement of the first, second, and third portions with respect to the deck.

20 Claims, 16 Drawing Sheets

Related U.S. Application Data division of application No. 13/153,090, filed on Jun. 3, 2011, now Pat. No. 8,677,633.

(60) Provisional application No. 61/351,118, filed on Jun. 3, 2010.

(51) Int. Cl.
    *B23D 55/02*     (2006.01)
    *B23D 59/00*     (2006.01)

(56) References Cited

U.S. PATENT DOCUMENTS

| | | | |
|---|---|---|---|
| 2,722,953 A | 11/1955 | Lee | |
| 2,827,085 A | 3/1958 | Ocenasek | |
| 3,121,910 A | 2/1964 | Wells et al. | |
| 3,621,894 A | 11/1971 | Niksich | |
| 3,658,102 A | 4/1972 | Joosten | |
| 3,829,970 A | 8/1974 | Anderson | |
| 3,830,131 A | 8/1974 | Wells | |
| 3,848,502 A | 11/1974 | O'Neill | |
| 3,961,550 A | 6/1976 | Oliver et al. | |
| 3,974,724 A | 8/1976 | Shadle | |
| 4,001,937 A | 1/1977 | Stelljes et al. | |
| 4,160,320 A | 1/1979 | Wikoff | |
| 4,204,352 A | 5/1980 | Laughton et al. | |
| 4,204,444 A | 5/1980 | Kohr | |
| 4,413,414 A | 11/1983 | Strzalka | |
| 4,604,772 A | 8/1986 | Arff | |
| 4,615,464 A | 10/1986 | Byrns | |
| 4,630,372 A | 12/1986 | Nagashima | |
| 4,711,032 A | 12/1987 | Rickmers et al. | |
| 4,953,295 A | 9/1990 | Barradas et al. | |
| 5,083,671 A | 1/1992 | Hayes | |
| 5,251,525 A | 10/1993 | Galloway | |
| 5,288,453 A | 2/1994 | Rutenbeck | |
| 5,388,334 A | 2/1995 | Halsey | |
| 6,237,230 B1 | 5/2001 | Campbell et al. | |
| 6,659,276 B2 | 12/2003 | Anderson et al. | |
| 6,691,599 B2 | 2/2004 | Kao | |
| 6,793,074 B2 | 9/2004 | Anderson et al. | |
| 6,837,134 B2 | 1/2005 | Chin-Chin | |
| 6,857,347 B1 | 2/2005 | Benedict et al. | |
| 6,948,412 B2 * | 9/2005 | Brazell | B23D 59/006 144/252.2 |
| 6,988,633 B2 | 1/2006 | Grinnall et al. | |
| D527,967 S | 9/2006 | Klingbeil et al. | |
| 7,287,454 B2 | 10/2007 | McIntosh | |
| 7,331,111 B2 | 2/2008 | Myers | |
| 7,404,727 B1 | 7/2008 | Lee et al. | |
| 7,510,468 B2 | 3/2009 | Clifford et al. | |
| 7,926,187 B2 | 4/2011 | Uehlein-Proctor et al. | |
| 8,677,663 B1 | 3/2014 | Holly et al. | |
| 9,227,255 B2 * | 1/2016 | Holly | B23D 53/12 |
| 2004/0020061 A1 | 2/2004 | O'Banion | |
| 2004/0139835 A1 | 7/2004 | Wright et al. | |
| 2005/0178256 A1 | 1/2005 | Bocka et al. | |
| 2006/0260458 A1 | 11/2006 | Friend | |
| 2007/0068011 A1 | 3/2007 | Shibata et al. | |
| 2008/0000093 A1 | 1/2008 | McIntosh | |
| 2008/0005912 A1 | 1/2008 | McIntosh | |
| 2008/0006136 A1 | 1/2008 | McIntosh | |
| 2008/0282556 A1 | 11/2008 | McIntosh | |
| 2009/0183377 A1 | 7/2009 | Loveless et al. | |
| 2009/0265943 A1 | 10/2009 | Miller et al. | |
| 2010/0018064 A1 | 1/2010 | Bertsch et al. | |
| 2010/0018371 A1 | 1/2010 | Wilbert | |
| 2010/0024225 A1 | 2/2010 | Wackwitz | |
| 2010/0095537 A1 | 4/2010 | Serdynski et al. | |
| 2011/0119934 A1 | 5/2011 | Bertsch et al. | |
| 2014/0173916 A1 | 6/2014 | Holly et al. | |
| 2016/0096229 A1 * | 4/2016 | Holly | B23D 53/12 30/380 |

FOREIGN PATENT DOCUMENTS

| | | |
|---|---|---|
| JP | H09285913 | 11/1997 |
| JP | 2006212807 | 8/2006 |
| JP | 2007260795 | 10/2007 |
| JP | 2008207272 | 9/2008 |
| KR | 20070031348 | 3/2007 |
| KR | 100782521 | 12/2009 |
| WO | 2010011925 | 1/2010 |
| WO | 2010014865 | 2/2010 |

* cited by examiner

WORKPIECE GUARD AND BLADE GUARD FOR BAND SAW

CROSS REFERENCE TO RELATED APPLICATION

This application is a continuation of U.S. patent application Ser. No. 14/193,457 filed Feb. 28, 2014, now U.S. Pat. No. 9,227,255, which is a divisional of U.S. patent application Ser. No. 13/153,090 filed Jun. 3, 2011, now U.S. Pat. No. 8,677,633, which claims priority to U.S. Provisional Patent Application No. 61/351,118 filed Jun. 3, 2010. The entire contents of all these applications are incorporated herein by reference.

BACKGROUND

The present invention relates to power tools, and more particularly to band saws.

Band saws typically include a continuous band saw blade disposed about a pair of pulleys, or wheels, and driven by one of the pulleys, and a guard surrounding an outer circumference of the band saw blade. The guard covers the side of the band saw blade as it rotates about the wheels and protects the band saw blade from being disrupted and/or misaligned. The bottom of the band saw is open such that the band saw blade and pulleys are accessible for removal to facilitate band saw blade replacement.

SUMMARY OF THE INVENTION

The invention provides, in one aspect, a method of manufacturing a band saw. The method includes providing a deck, coupling first and second wheels to the deck for receiving a continuous blade thereabout, coupling a motor to the deck for driving at least one of the first or second wheels, providing a handle for a user to hold the band saw, providing a blade guard having a first portion adjacent the first wheel and a second portion adjacent the second wheel, fixing the first and second portions to each other, and hingedly coupling the first and second portions to the deck for simultaneous movement with respect to the deck.

In another aspect, the invention provides a hand-held band saw for cutting a workpiece. The hand-held band saw includes a deck, first and second wheels coupled to the deck for receiving a continuous blade thereabout, a motor coupled to the deck for driving at least one of the first or second wheels, and a handle providing a grip for a user to hold the band saw. The band saw also includes a blade guard having a first portion adjacent the first wheel, a second portion adjacent the second wheel, and a third portion adjoining the first and second portions. A joint couples the first, second, and third portions to the deck for simultaneous movement of the first, second, and third portions with respect to the deck.

In yet another aspect, the invention provides a hand-held band saw for cutting a workpiece. The hand-held band saw includes a deck defining a front and a rear, the deck having an opening in the front defining a cut zone and a first deck portion generally located on a first side of the opening and a second deck portion generally located on a second side of the opening. The band saw also includes a first wheel supported by the first deck portion, a second wheel supported by the second deck portion, the first and second wheels for supporting a blade. The band saw also includes a motor operably coupled to the first wheel, a handle providing a grip for a user to hold the band saw, a blade guard configured to provide a barrier between the blade and an exterior of the band saw, and a joint between the blade guard and the deck such that the blade guard is movable with respect to the deck. The blade guard includes a first portion adjacent the first wheel, a second portion adjacent the second wheel, and a third portion adjoining the first and second portions such that the first, second, and third portions move as one piece with respect to the deck.

Other features and aspects of the invention will become apparent by consideration of the following detailed description and accompanying drawings.

Figure 1:
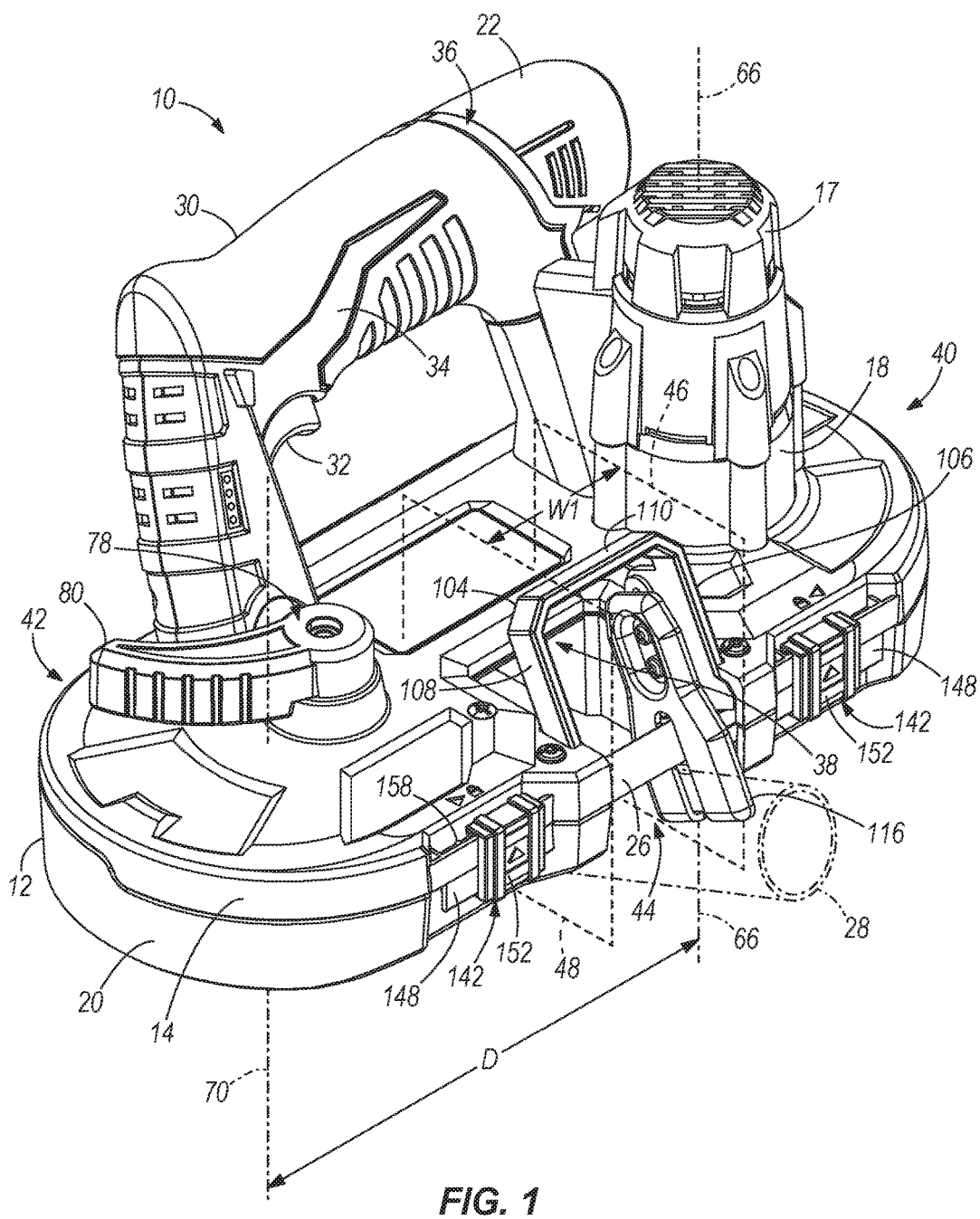
FIG. 1 is a top perspective view of a band saw according to one construction of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-16 illustrate a band saw 10 having a frame or housing 12 according to one construction of the invention. The housing 12 includes a deck 14 supporting a motor 16 (FIG. 14) and a gear box 18 and a blade guard 20 coupled to the deck 14. In the illustrated construction, the motor 16 is configured as a DC motor, and the band saw 10 includes removable, rechargeable battery 22 to deliver power to the motor 16. The motor 16 is enclosed by a housing 17, preferably formed of plastic. The gear box 18 is preferably formed of a metal. Other suitable materials may be employed.

The motor 16 is drivingly connected to a drive assembly 24 (FIG. 14) at least partially housed within the gear box 18.

The drive assembly 24 may include any of a number of different gear train arrangements configured to provide a low-speed, high-torque output from the high-speed, low-torque input provided by the motor 16. The motor 16 and the drive assembly 24 are operable to drive a continuous band saw blade 26 having a cutting edge 114 to cut a workpiece 28.

Figure 2:
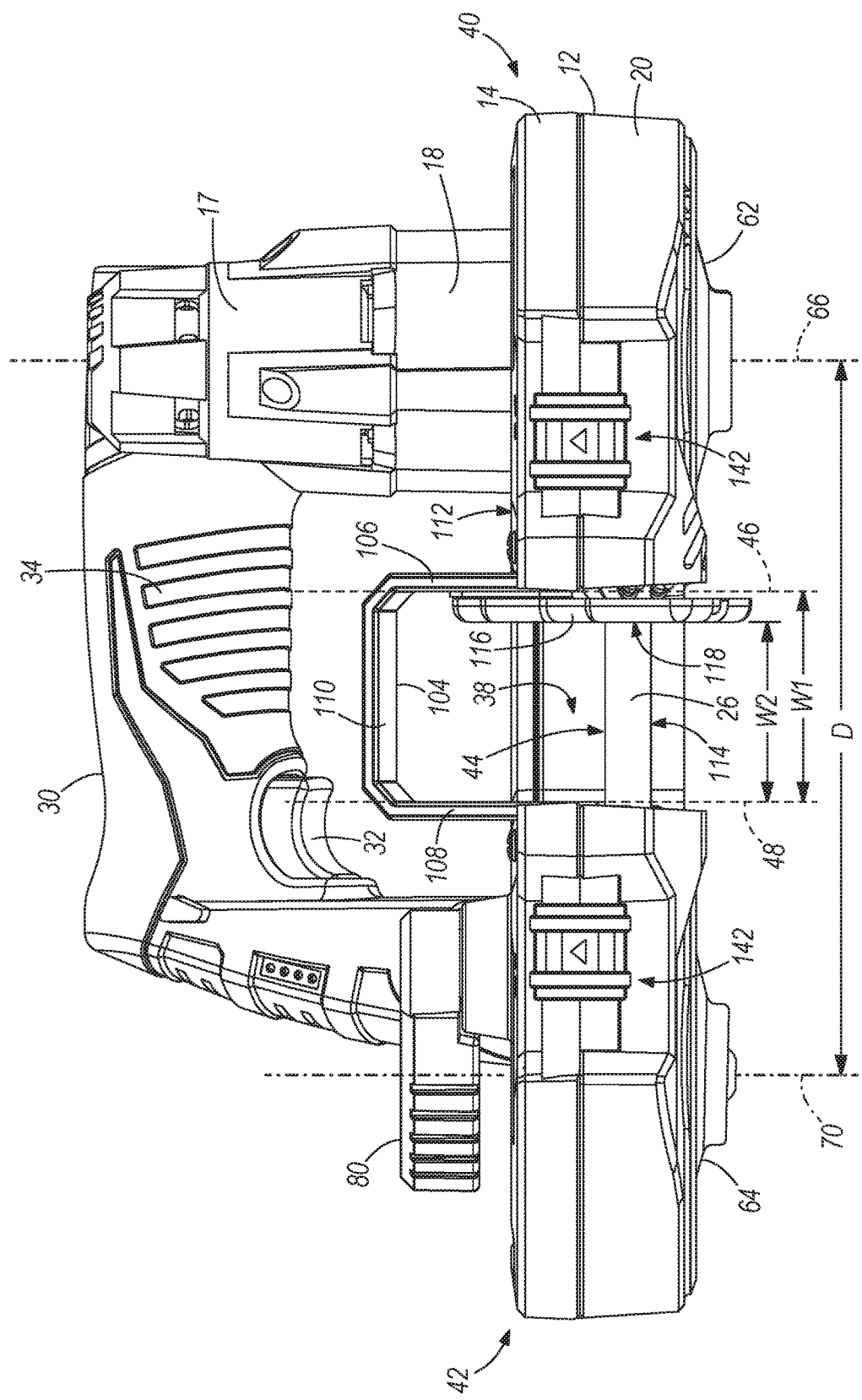
FIG. 2 is a front view of the band saw shown in FIG. 1.
Figure 3:
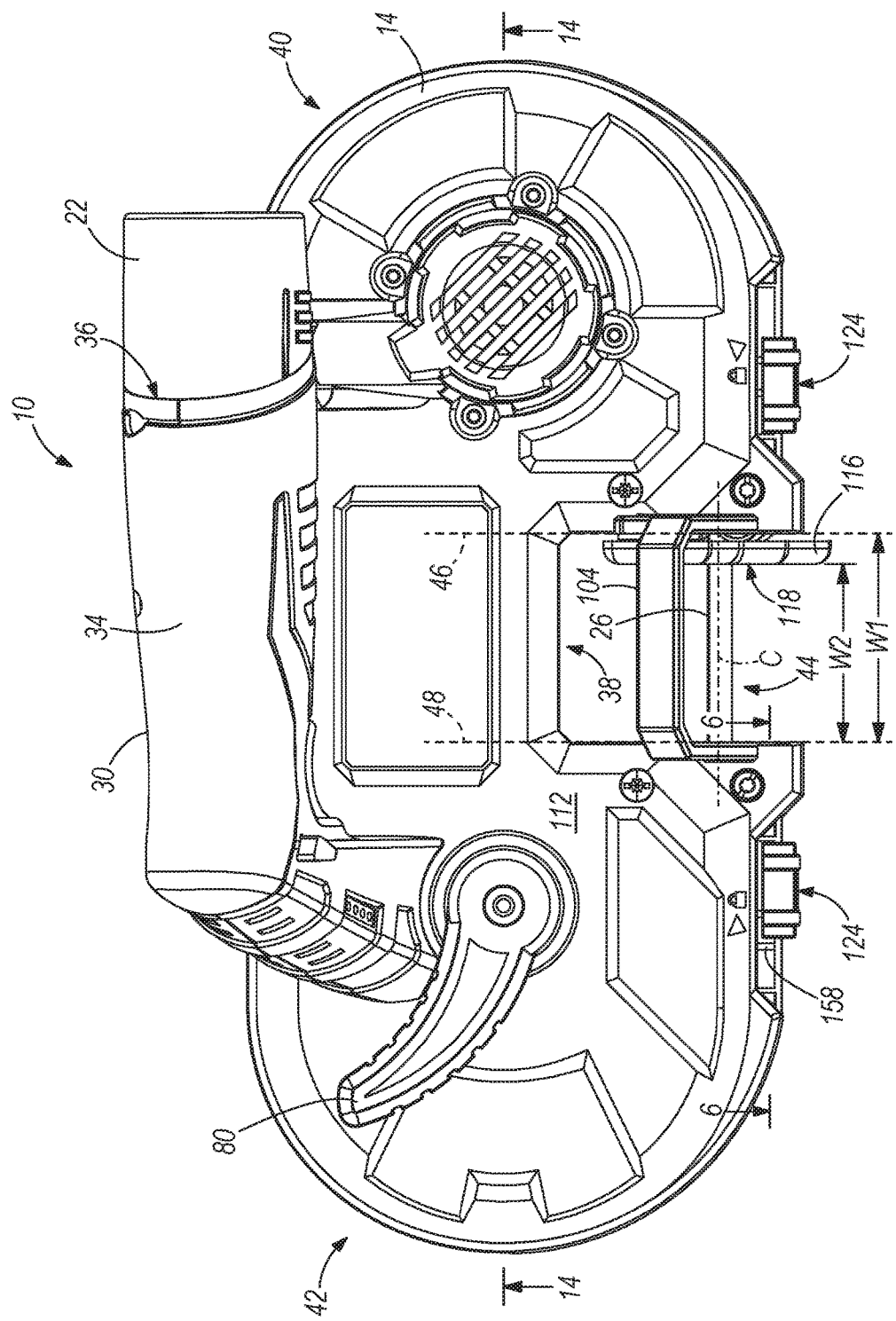
FIG. 3 is a top view of the band saw shown in FIG. 1.

With particular reference to FIGS. 1-3, the housing 12 includes a single handle 30 supporting a trigger switch 32 to provide power to the band saw 10. The switch 32 is operable to control operation of the motor 16. Generally, the handle 30 is shaped and arranged for one-handed operation of the band saw 10 as the workpiece 28 is cut. The handle 30 includes a grip portion 34 adjacent the trigger 32. The grip portion 34 is shaped for accommodating a gripping action by the user's hand during operation of the band saw 10.

In the illustrated construction, the battery 22 is a 12-volt power tool battery coupled to the handle 30. The battery 22 is coupled to a portion of the handle 30 adjacent the grip portion 34. The battery 22 is coupled to the handle 30 by inserting a portion of the battery 22 within a portion of the handle 30, i.e., a cavity or recess 36 formed in the handle 30 for receiving the battery 22. In further constructions, the battery 22 may be coupled to the handle 30 by sliding, snapping, rotating, or the like. The recess 36 also includes a terminal assembly (not shown) for electrically connecting the battery 22 to the band saw motor 16 via an electrical circuit (not shown). The battery 22 includes Lithium-ion battery cells. In other constructions of the band saw 10, the battery 22 may have higher or lower nominal voltage. Additionally or alternatively, the battery cells may have chemistries other than Lithium-ion such as, for example, Nickel Cadmium, Nickel Metal-Hydride, or the like. In other constructions, other sources of power, such as a power cord to provide AC power to an AC motor, may be employed.

With particular reference to FIG. 3, the housing 12, and more particularly the deck 14 and the guard 20, defines an opening or U-shaped cavity 38. A first housing portion 40 is generally defined to one side of the opening 38 and a second housing portion 42 is generally defined to the opposite side of the opening 38. The opening 38 receives the workpiece 28 and includes a cut zone 44 in which the workpiece 28 is cut by a portion of the band saw blade 26 that is located in the opening 38. With particular reference to FIG. 1, the opening 38 is delimited by first and second parallel, facing planes 46, 48 that are substantially normal to the portion of the band saw blade 26 positioned in the opening 38. The portion of the saw blade 26 positioned in the opening 38 defines a cutting axis C intersecting each of the planes 46, 48 and is oriented substantially normal to each of the planes 46, 48 between the respective planes 46, 48. The opening 38 has a width W1 defined as the perpendicular distance between the first and second planes 46, 48.

The handle 30 extends from a top of the deck 14 on a side of the deck opposite the cutting edge 114 of the blade 26, and extends from the first housing portion 40 on one end and the second housing portion 42 on the other end. Thus, the handle 30 extends between the first housing portion 40 and the second housing portion 42. The handle 30 is positioned at the rear of the band saw 10 opposite the cut zone 44. The grip portion 34 is positioned substantially between the first and second planes 46, 48. The grip portion 34 is adjacent the trigger 32 and configured to be grasped by an operator's hand. The trigger 32 is also at least partially positioned between the first and second planes 46, 48. In other constructions, the trigger 32 may be positioned outside of the first and second planes 46, 48 and adjacent or near one of the first and second planes 46, 48.

Figure 5:
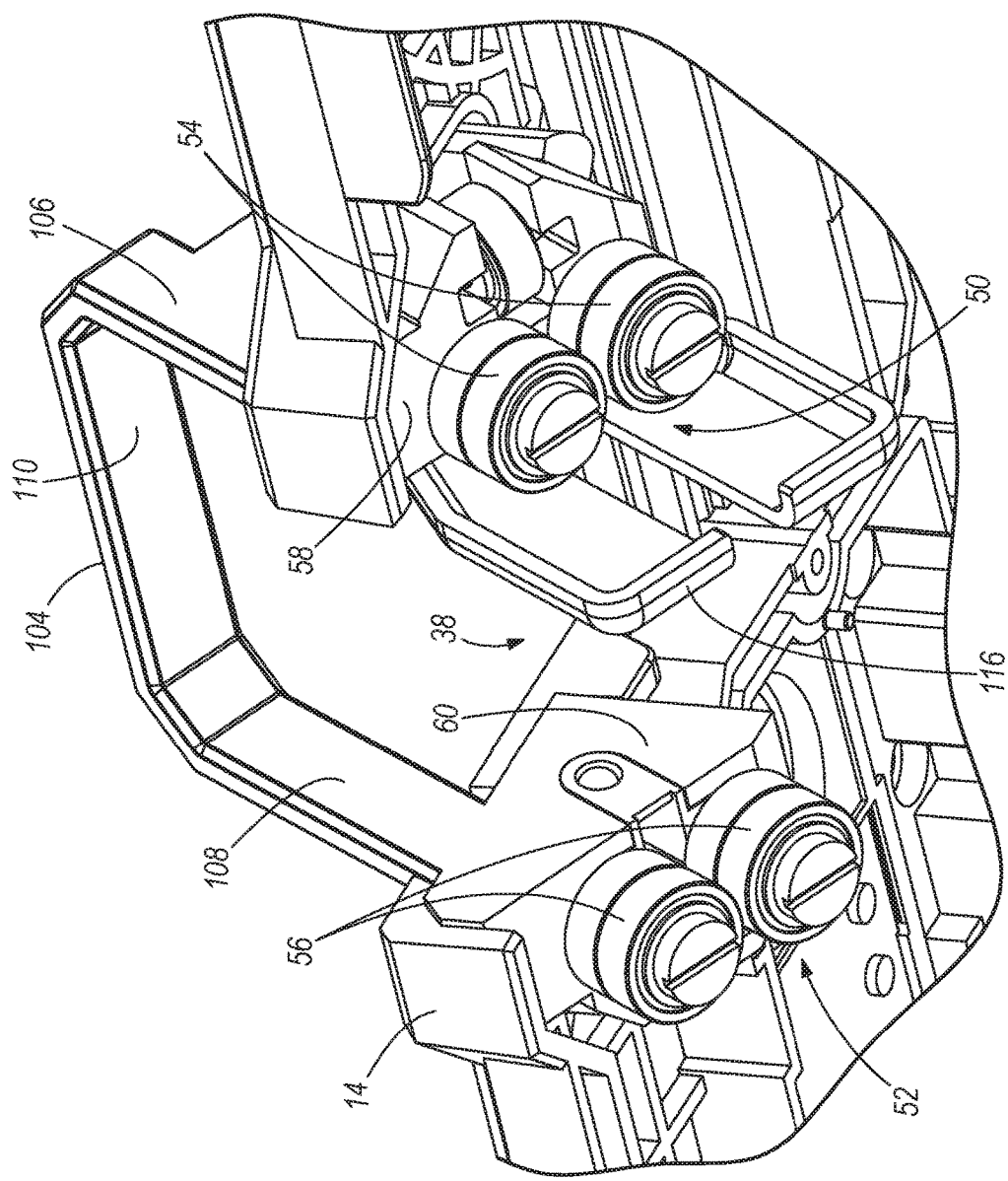
FIG. 5 is a bottom perspective view of a portion of the band saw shown in FIG. 1.

Referring to FIG. 5, the band saw 10 includes a first guide roller set 50 disposed on one side of the cavity 38 adjacent the first plane 46 and on the first housing portion 40, and a second guide roller set 52 disposed on an opposite side of the cavity 38 adjacent the second plane 62 and on the second housing portion 42. Each of the guide roller sets 50, 52 includes a pair of aligned rollers 54, 56, respectively, with which opposite sides of the saw blade 26 are engaged and a respective mounting block 58, 60 to which the rollers 54, 56 are rotatably supported. The mounting blocks 58, 60 are coupled to the deck 14 (e.g., using fasteners). The first and second guide roller sets 50, 52 support the band saw blade 26 as the blade 26 enters and exits the cut zone 44.

Figure 7:
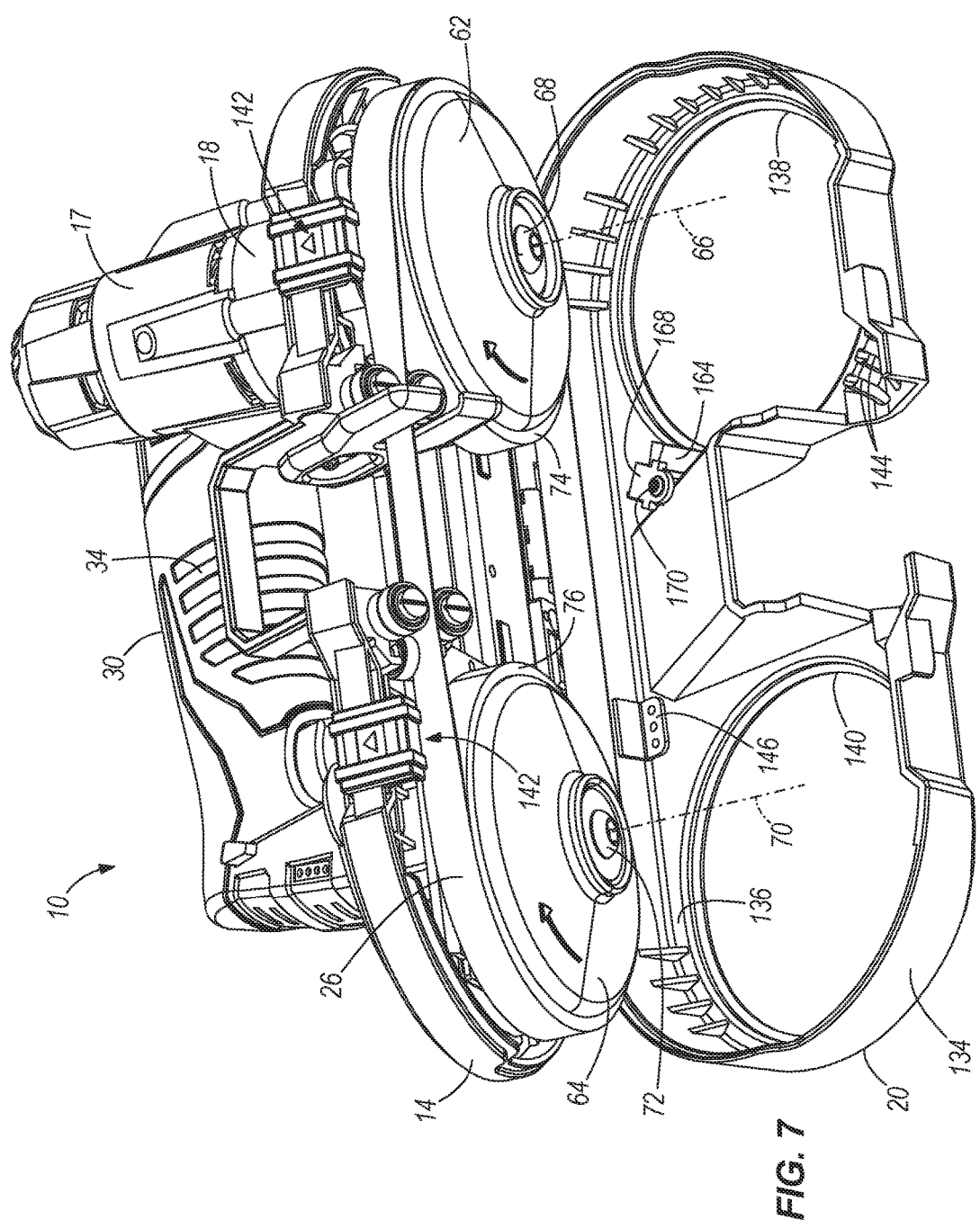
FIG. 7 is a bottom perspective view of the band saw of FIG. 1 shown in an open position.
Figure 8:
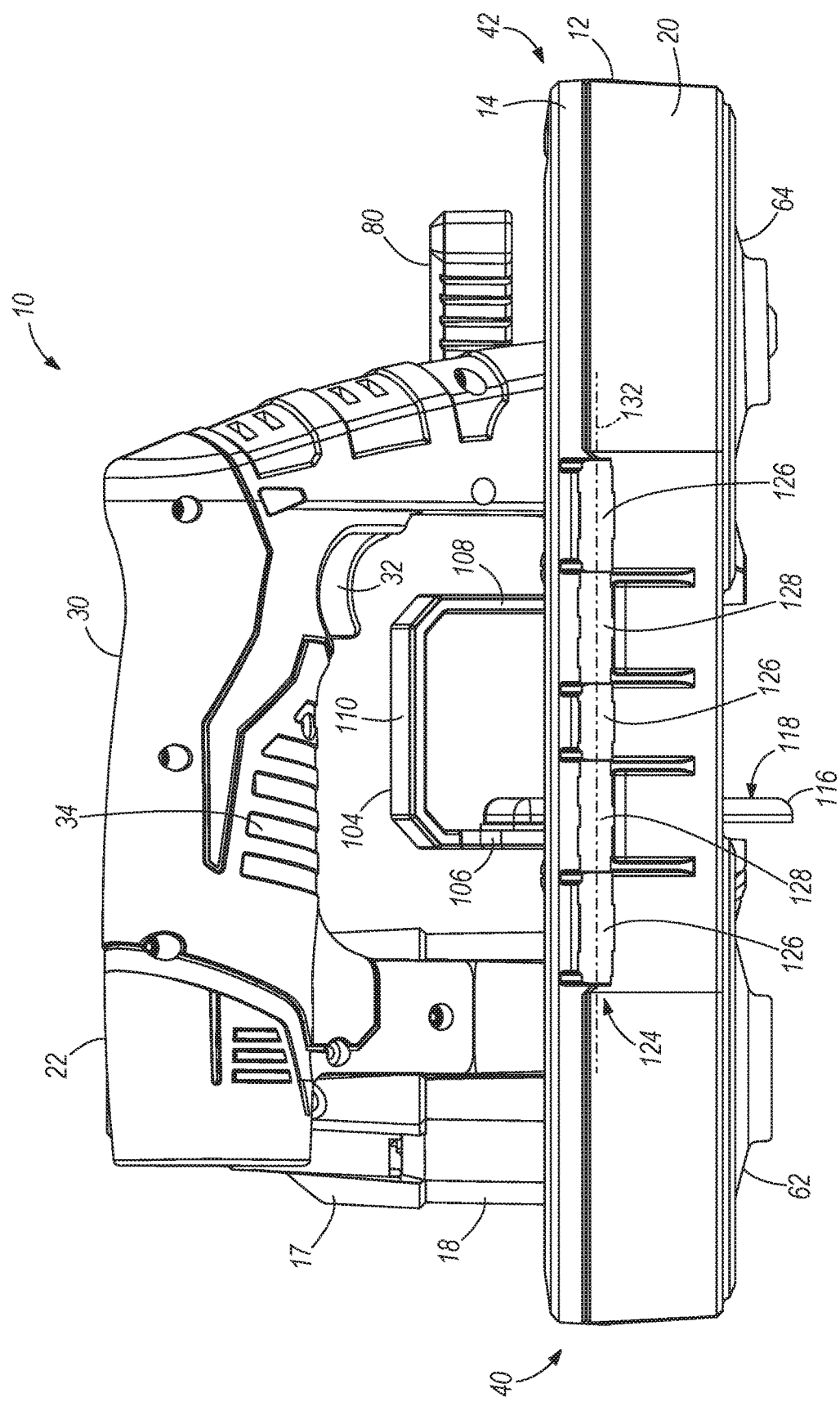
FIG. 8 is a rear view of the band saw shown in FIG. 1.

With reference to FIG. 7, the band saw 10 includes a drive wheel 62 and a driven wheel 64. The drive wheel 62 is generally disposed in the first housing portion 40 and the driven wheel 64 is generally disposed in the second housing portion 42. The drive wheel 62 rotates about a drive wheel axis 66 defined by a drive wheel axle 68 and is drivingly connected to the motor 16 via the drive assembly 24 in the gear box 18. The driven wheel 64 rotates about a driven wheel axis 70 defined by a driven wheel axle 72 and is rotatably supported by the deck 14. A distance D (FIG. 1) between the driven wheel axis 70 and the drive wheel axis 66 is approximately 6.75 inches, and the drive and driven wheels 62, 64 each have a diameter of approximately 3.5 inches. In other constructions, the band saw 10 may be smaller or larger.

A drive tire 74 and a driven tire 76 are coupled to the periphery of the respective drive wheel 62 and the driven wheel 64. Each of the tires 74, 76 is a circular-shaped ring formed of a soft and/or flexible elastomeric material that is able to lock or adhere to the drive wheel 62 or the driven wheel 64. The band saw blade 26 extends around the drive wheel 62 and the driven wheel 64 and grips the tires 74, 76 and, as a result, motion from the drive wheel 62 is transmitted to the band saw blade 26 via the wheel tires 74, 76.

With reference to FIGS. 1 and 13-16, the band saw 10 also includes a blade tensioning mechanism 78 coupled to the deck 14 to adjustably provide appropriate tension on the band saw blade 26. The blade tensioning mechanism 78 is operable to move the driven wheel axle 72 closer to or farther away from the drive wheel axle 68 in order to decrease or increase the tension in the band saw blade 26, respectively. Specifically, the blade tensioning mechanism 78 includes a lever 80 having a pivot axis 82 and an eccentric lobe 84 coupled to the lever 80 and defining a central axis 86 that is parallel to and non-coincident with the pivot axis 82.

The blade tensioning mechanism 78 also includes a spring guide 88, preferably formed by stamping, having guide pins 90 formed as one piece therewith. The tensioning mechanism 78 also includes springs 92, such as coil springs, each of which is disposed about one of the guide pins 90, and a lobe guide 94 for receiving the eccentric lobe 84. The lobe guide 94 is coupled to and positioned in sliding relationship with the guide pins 90 and is limited, or stopped, at one end of the guide pins 90 by stops 96. One free end of each spring 92 abuts the spring guide 88 and another free end of each spring 92 abuts the lobe guide 94.

The driven wheel axle 72 is fastened to the spring guide 88 by way of a threaded fastener 98 and tilting blocks 100, 102. The tilting blocks 100, 102 include angled seats 101, 103 (FIG. 15), respectively, for receiving the threaded fastener 98 at a slight angle with respect to the drive wheel axis 66 for tiling the driven wheel axle 72 at the slight angle. For example, the driven wheel axle 72, and therefore the driven wheel axis 70, is tilted at an angle of about 1 to 3 degrees with respect to the drive wheel axis 66, and preferably about 1.25 degrees. The tiling of the driven wheel 64 provides an improved grip between the band saw blade 26 and the tire 76.

When the lever 80 is rotated such that the eccentric lobe 84 moves in an arcuate path in a direction towards the drive wheel 62, the eccentric lobe 84 pulls the lobe guide 94 towards the drive wheel 62. The lobe guide 94 thereby abuts the stops 96 and pulls the spring guide 88 towards the drive wheel 62, which pulls the driven wheel 64 towards the drive wheel 62, thus creating slack in the blade 26. Conversely, when the lever 80 is rotated such that the eccentric lobe 84 moves in an arcuate path in a direction away from the drive wheel 62, the eccentric lobe 84 pushes the lobe guide 94 towards the springs 92. The lobe guide 94 moves against the bias of the springs 92, which in turn pushes the driven wheel 64 away from the drive wheel 62, thereby creating tension in the blade 26.

With reference to FIGS. 1-4, the band saw 10 includes a bridge 104, or workpiece guard, for limiting the range of movement of the workpiece 28 after a cutting operation. The bridge 104 includes a U-shaped member extending from the housing 12, and specifically from the deck 14, in a direction away from the blade 26, or away from the opening 38. The U-shaped member includes first and second portions 106, 108 extending from the deck 14 and a third portion 110 extending between the first and second portions 106, 108. The first portion 106 extends from the deck 14 on the first housing portion 40 in a direction substantially perpendicular to the cutting axis C. The second portion 108 extends from the deck 14 on the second housing portion 42 in a direction substantially perpendicular to the cutting axis C. The third portion 110 extends between the first and second portions 106, 108 in a direction substantially perpendicular to the first and second portions 106, 108. In other constructions, one of the first and second portions 106, 108 may be absent such that the third portion 110 is cantilevered from the other of the first and second portions 106, 108.

As is best illustrated in FIG. 2, the third portion 110 of the bridge 104 is disposed between an upper surface 112 of the deck 14, i.e., the surface facing the handle 30, and the handle 30. The third portion 110 is positioned at a perpendicular distance from the cutting edge 114 (FIG. 2) of the blade 26 at least equal to a width W2 of the cut zone 44. The width W2 of the cut zone is defined as the perpendicular distance between a support surface 118 of a shoe 116 (which will be described in greater detail below) and the second plane 48. As such, the workpiece 28 is provided with enough space for the cutting operation to be completed without the bridge 104 limiting the cut. In a preferred construction, the width W2 is between approximately 1.5 and 1.8 inches, and is preferably approximately 1.65 inches.

Figure 4:
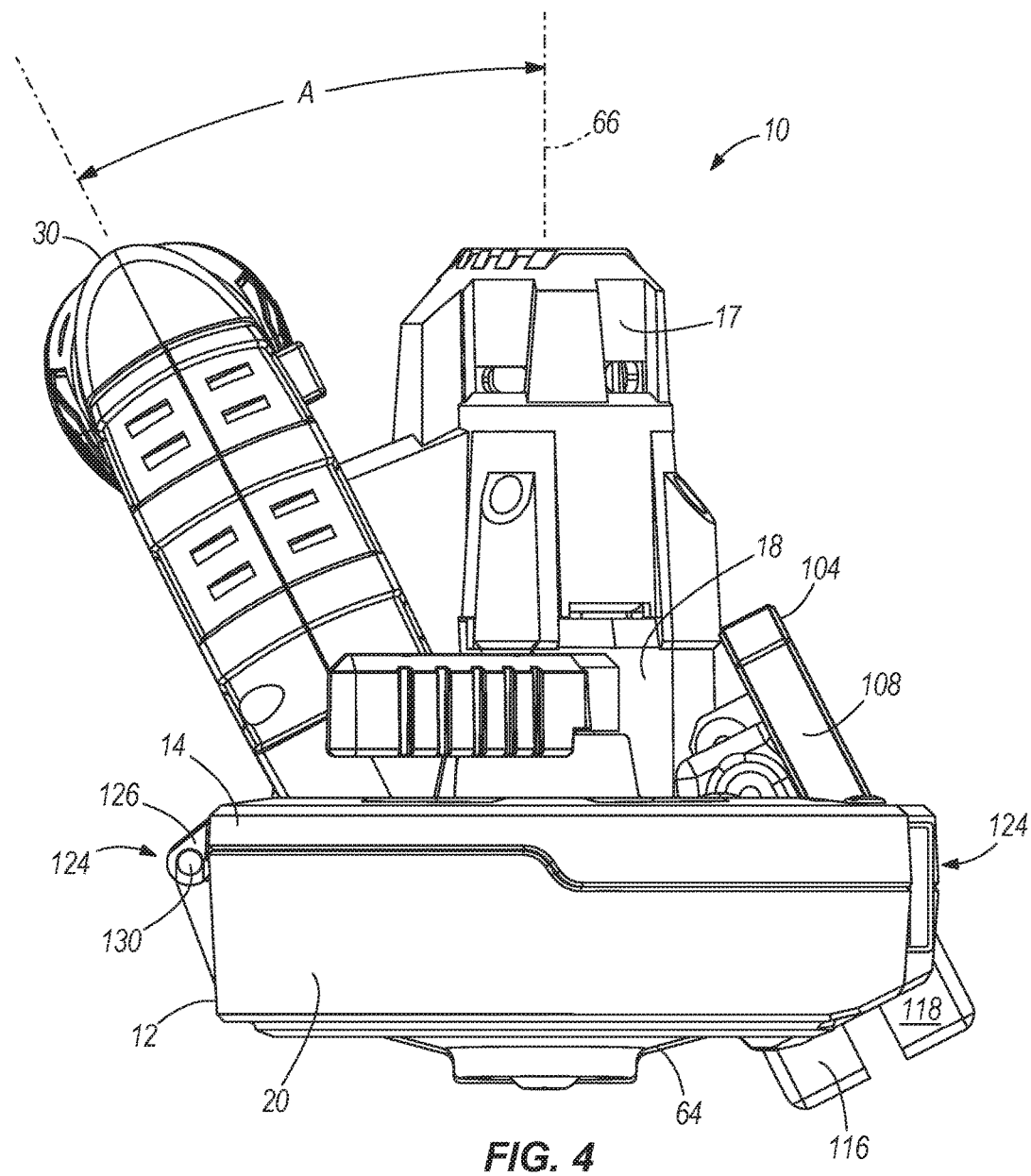
FIG. 4 is a left side view of a band saw shown in FIG. 1.

The bridge 104 spans the opening 38 between the first housing portion 40 and the second housing portion 42, or, in other words, between the first and second planes 46, 48. As best shown in FIG. 5, the bridge 104 is integrated, or formed as one piece, with the mounting blocks 58, 60 to which the guide roller sets 50, 52 are attached. This structure provides rigidity to the band saw 10 between the first housing portion 40 and the second housing portion 42. In other constructions, the bridge 104 may be formed as a separate piece from the mounting blocks 58, 60 and may be coupled to the mounting blocks 58, 60 or coupled directly to the deck 14. As best shown in FIG. 4, the bridge 104 is angled with respect to the drive wheel axis 66 at an angle similar to an angle of the blade 26 in the cut zone 44 and to an angle A of the handle 30 with respect to the drive wheel axis 66. In one construction, the angle A is between approximately 20 and 35 degrees and is preferably approximately 27 degrees. Other suitable angles may be employed.

The band saw 10 also includes a shoe 116 having a support surface 118 against which the workpiece 28 is abutted during a cutting operation. Best illustrated in FIG. 10, the shoe 116 is fastened to the band saw 10 by way of threaded fasteners 120, such as screws. The bridge 104 includes a shoe-receiving boss 122 to which the shoe 116 is fastened by the screws 120. The shoe-receiving boss 122 includes three apertures 123 for receiving the screws 120, and the shoe 116 includes two apertures 125 for receiving the screws 120, such that the shoe 116 is securable in two different positions with respect to the bridge 104.

With particular reference to FIGS. 7-9 and 12-13, the housing 12 includes the blade guard 20 pivotally coupled to the deck 14 for pivotal movement between a closed position (FIG. 1) and an open position (FIG. 7). In the illustrated construction, the blade guard 20 is formed as a separate piece from the deck 14 and is coupled to the deck 14 by way of a hinge 124 for pivotal movement relative to the deck 14. The hinge 124, such as a barrel hinge, includes barrel sections 126, 128 formed alternatingly with the deck 14 and the blade guard 20, respectively, and a pin 130 (FIG. 4) passing through the barrel sections 126, 128 and providing a pivot axis 132. In the illustrated construction, the pin 130 is formed from metal, the deck 14 and barrel sections 126 are formed as one piece from a polymer, and the blade guard 20 and barrel sections 128 are formed as one piece from a polymer. In other constructions, other suitable materials may be employed.

Figure 12:
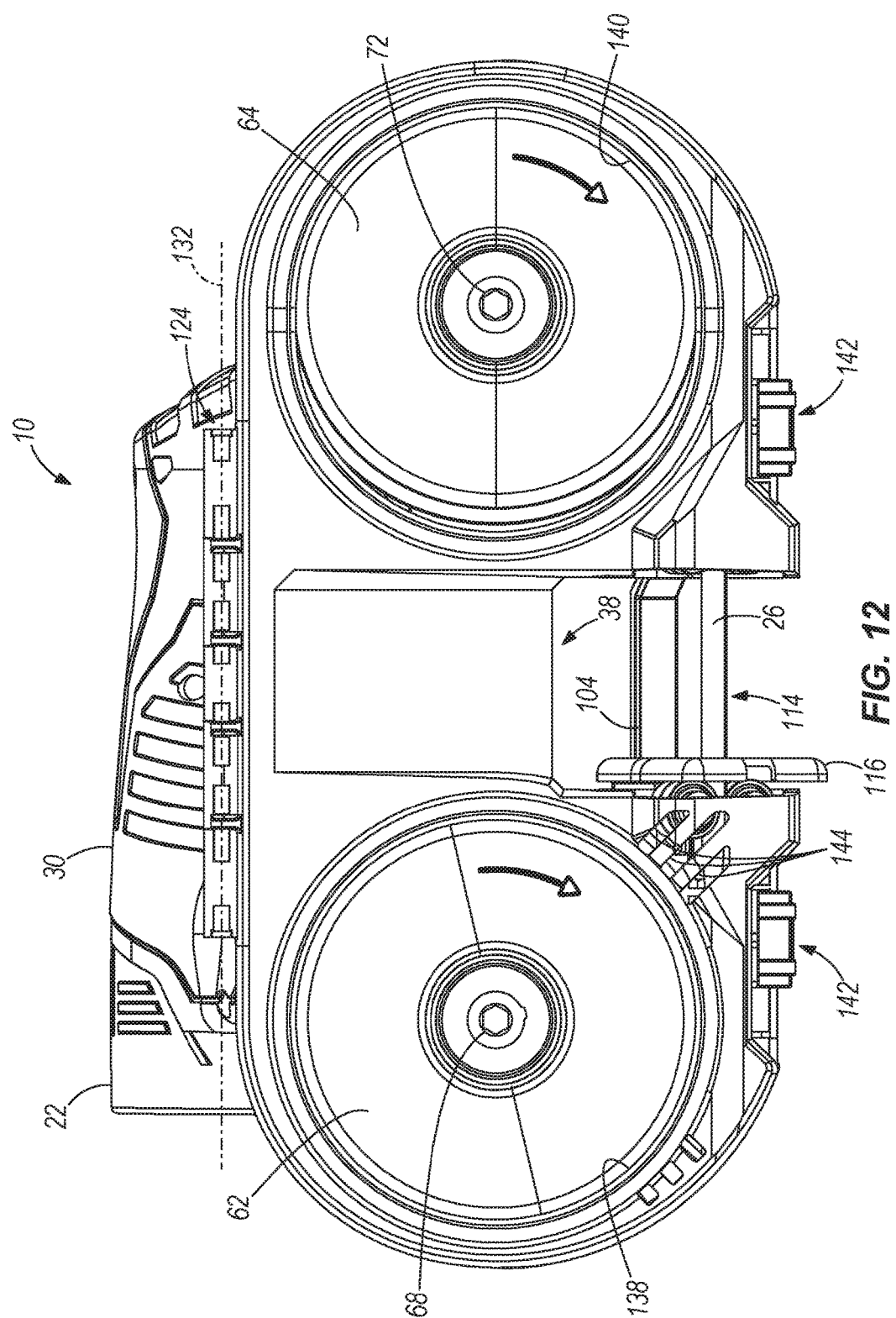
FIG. 12 is a bottom view of the band saw shown in FIG. 1.

In the closed position, the deck 14 and the blade guard 20 cooperate to substantially enclose the band saw blade 26, except the portion of the band saw blade 26 positioned in the cut zone 44 (i.e., the portion of the band saw blade 26 positioned in the opening 38 and between the first and second planes 46, 48). The portion of the blade 26 not positioned in the cut zone 44 is substantially enclosed, or inaccessible, when the housing 12 is in the closed position. The blade guard 20 includes a side wall 134 extending about the perimeter of the band saw blade 26, and a bottom wall 136 extending from the side wall 134 to cover the cutting edge 114 of the band saw blade 26 and portions of the bottom of the drive and driven wheels 62, 64. The bottom wall 136 includes first and second openings 138, 140 positioned centrally over portions of the drive and driven wheels 62, 64, respectively. The openings 138, 140 are approximately centered about the drive axis 66 and the driven axis 70, respectively (FIG. 12). The openings 138, 140 are positioned proximate at least a portion of the drive and driven wheels 62, 64 respectively to allow chips and debris carried by the blade 26 an outlet from the housing 12. The side wall 134 includes a substantially straight edge 190 extending between two substantially semi-circular edges 192a, 192b (FIG. 9).

Figure 9:
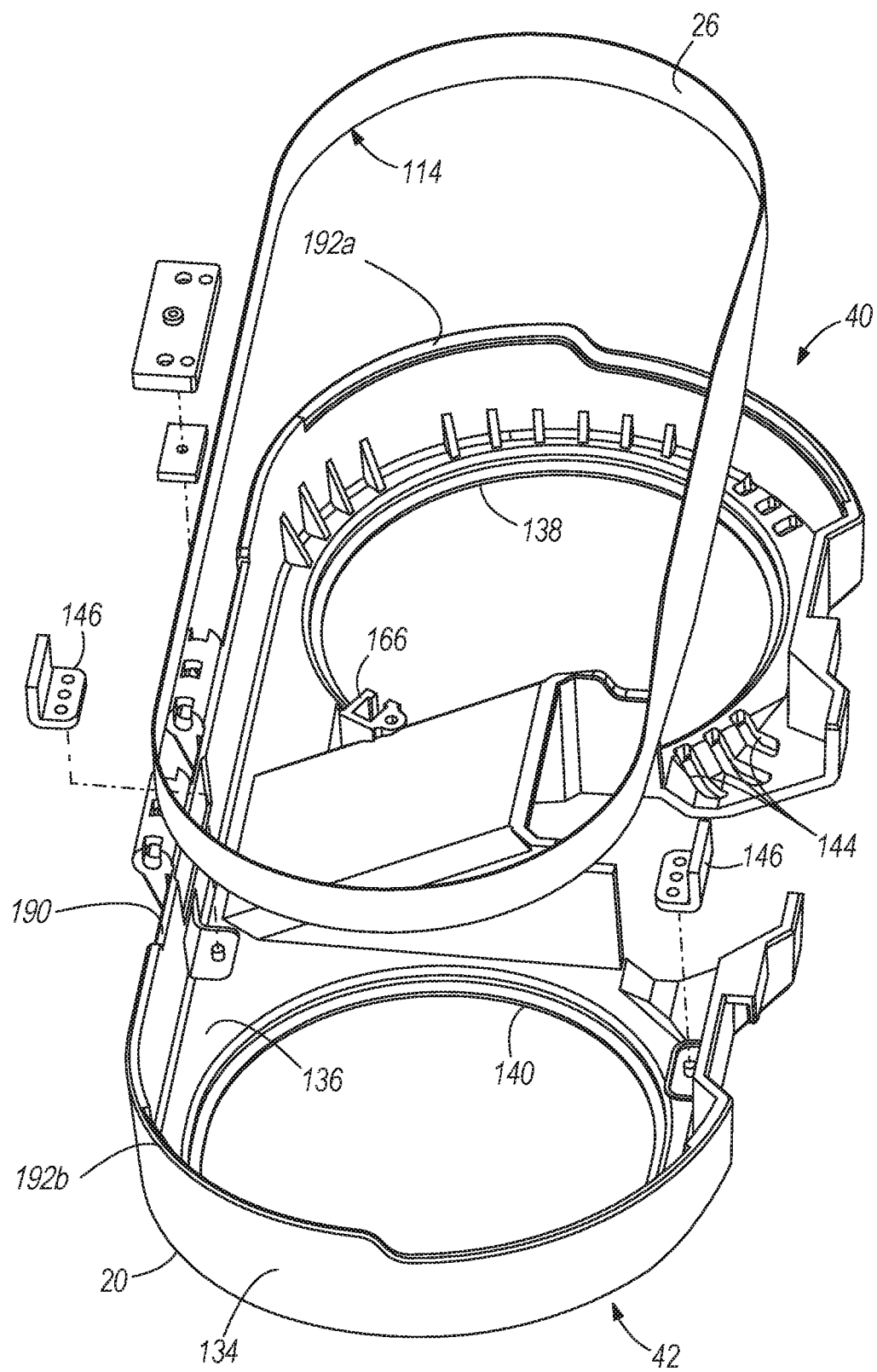
FIG. 9 is an exploded view of a portion of the band saw shown in FIG. 1.
Figure 10:
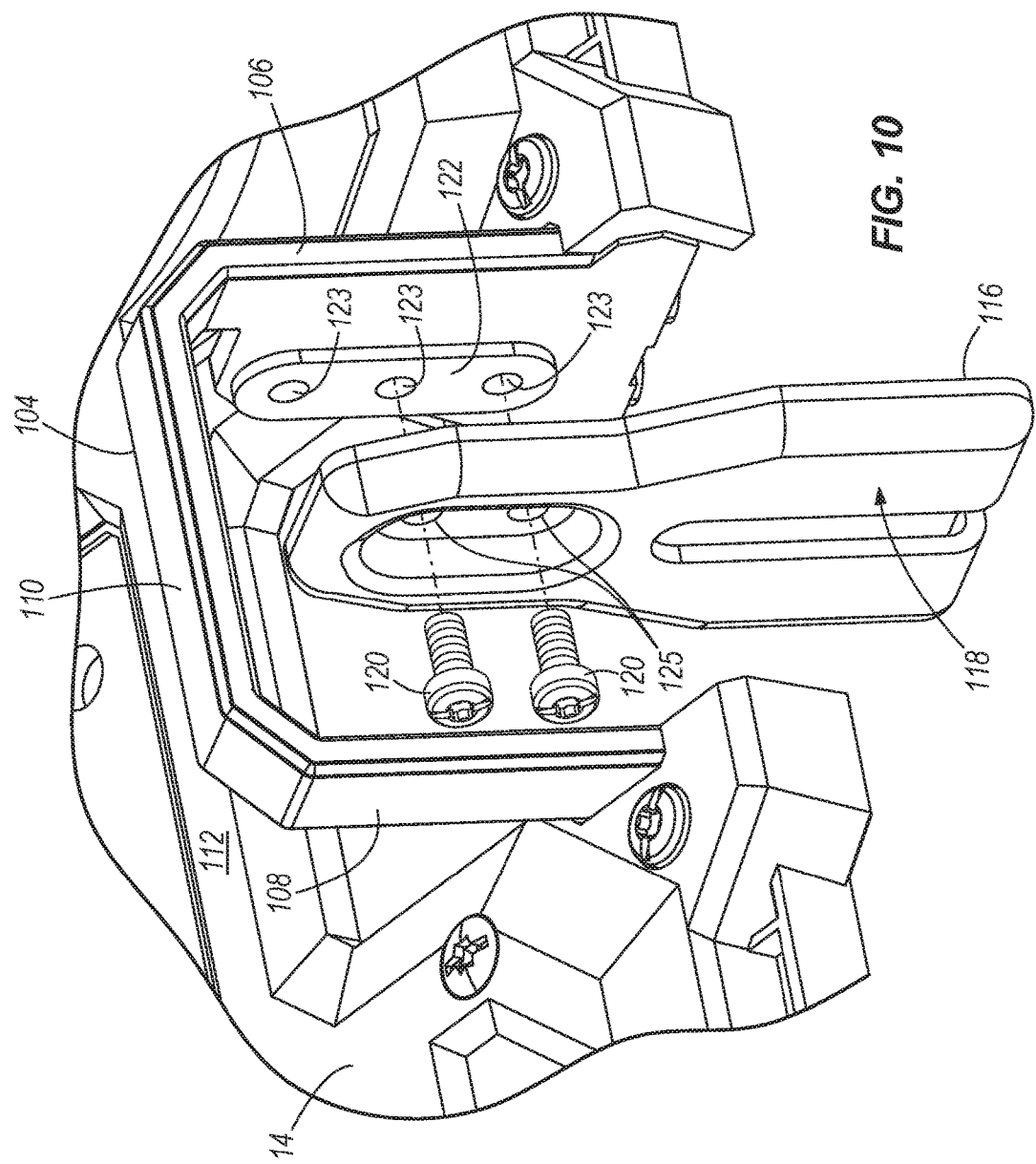
FIG. 10 is an exploded view of a portion of the band saw shown in FIG. 1.

With reference to FIGS. 7, 9 and 12, the blade guard 20 includes chip vents 144 adjacent the blade 26 as the blade exits the cut zone 44. In the illustrated construction, the chip vents 144 are positioned on the first housing portion 40 proximate the drive wheel 62 and the shoe 116. The chip vents 144 provide an outlet for chips and debris from the housing 12. With particular reference to FIGS. 7 and 9, wear plates 146 are received on an inner surface of the blade guard 20 adjacent the cutting edge 114 of the blade 26 for preventing the blade 26 from cutting through the blade guard 20. The wear plates 146 are preferably formed of a metal, such as steel or aluminum, or another suitable material that is harder than the material of the blade guard 20. In the illustrated construction, the wear plates 146 are located on the second housing portion 42, or driven wheel side of the blade guard 20. In other construction, the wear plates 146 may additionally or alternatively be positioned on the first housing portion 40, or drive wheel side of the blade guard 20.

A pair of latches 142 couple the blade guard 20 to the deck 14 in the closed position. The latches 142 are substantially mirror images of the each other. The latches 142 each include a deck lip 148 (FIG. 13) generally extending from the deck 14 and disposed at outer ends of the latches 142 with respect to the opening 38, a guard lip 150, which is a projection extending from the blade guard 20 and disposed at inner ends of the latches 142 with respect to the opening 38, and a generally C-shaped latch member 152. The latch members 152 are slidably coupled to the deck 14 such that they are slidable between a locked position (FIGS. 1-4, 6, 12) in which the deck 14 and blade guard 20 are substantially fixed relative to one another and an unlocked position (FIG. 7) in which the blade guard 20 is free to pivot away from the deck 14 on the hinge 124. The latch members 152 slide in a direction generally perpendicular to the drive wheel axis 66.

With reference to FIG. 7, in the open position, the latch members 152 are positioned away from the opening 38 such that the latch members 152 engage, and are positioned about, the deck lips 148. With reference to FIG. 2, in the closed position, the guard lips 150 are positioned towards the opening 38 such that the latch members 152 engage, and are positioned about, the guard lips 150 to lock the blade guard 20 to the deck 14. In the closed position, the guard lips 150 are generally parallel and adjacent to the deck lips 148.

Figure 6:
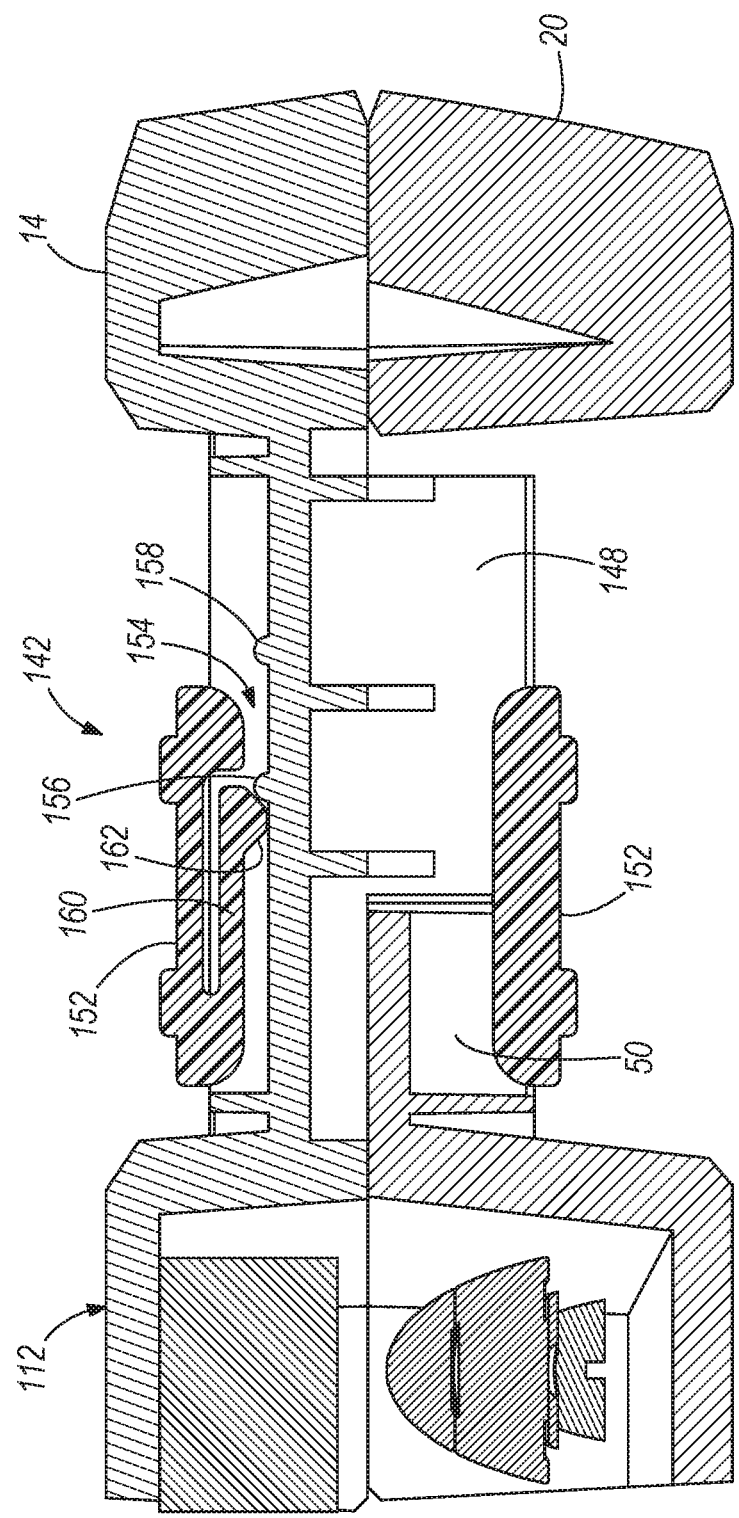
FIG. 6 is a cross section of a portion of the band saw of FIG. 3 taken along line 6-6.

FIG. 6 illustrates a cross section of the latch 142 in which the latch member 152 is in the locked position. The latch 142 includes a detent mechanism 154 that provides a threshold force below which the latch member 152 will not slide between the locked and unlocked positions. The detent mechanism 154 includes first and second projections, ribs or bumps 156, 158, respectively, formed on a surface, such as the upper surface 112, of the deck 14. A cantilevered spring arm 160 is formed on an inner surface of the latch member 152 facing the deck 14 and includes a projection 162 extending towards the deck 14, and specifically towards the bumps 156, 158. The projection 162 cooperates with the first and second bumps 156, 158 to provide the threshold force for sliding the sliding member between the locked and unlocked positions. The spring arm 160 deflects under a force greater than the threshold force such that the latch member 152 slides past the first bump 156 and subsequently the second bump 158 to the unlocked position. If the force applied is lower than the threshold force, the projection 162 abuts the first or second bump 156, 158 to inhibit the latch member 152 from sliding.

Figure 11:
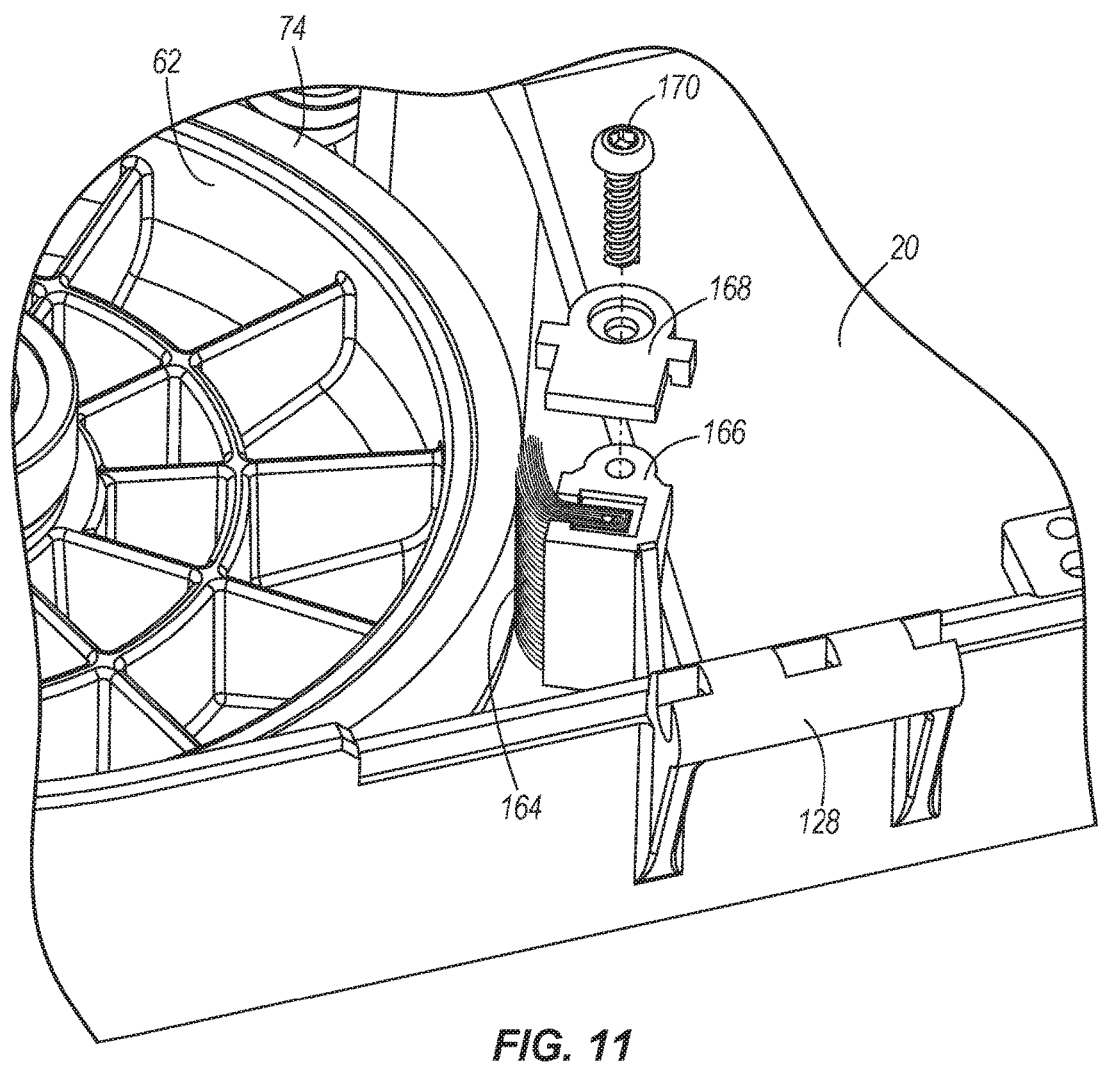
FIG. 11 is an exploded view of a portion of the band saw shown in FIG. 1.

FIGS. 7 and 11 illustrate a tire brush 164 formed from bristles made of a polymer, such as nylon. In other constructions, the bristles may be made of other polymers, metals and other suitable materials. The tire brush 164 is received in a bristle receptacle 166 extending from an inner surface of the blade guard 20 proximate the opening 138 for the drive wheel 62. The tire brush 164 is positioned in contact with the drive wheel tire 74 to clean chips and debris from the drive wheel tire 74. The tire brush 164 is sandwiched within the receptacle 166 and secured in place by a cap 168 fastened to the receptacle 166 by a fastener 170, such as a screw. The screw 170 and cap 168 are readily removable when the blade guard 20 is open for easy replacement of the tire brush 164.

Figure 13:
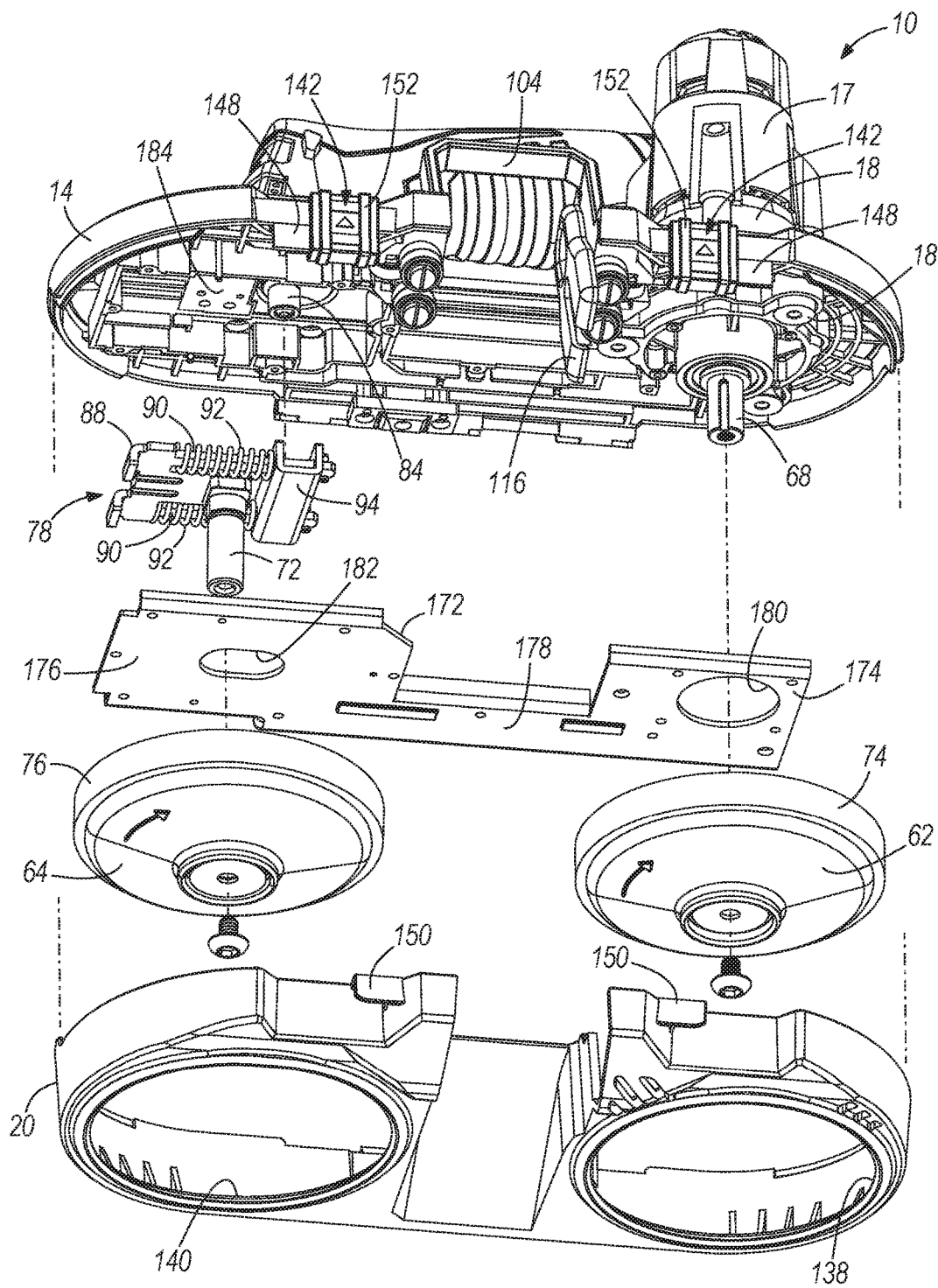
FIG. 13 is an exploded view of the band saw shown in FIG. 1.

FIG. 13 illustrates an exploded view of the band saw 10. The band saw 10 includes a reinforcement plate 172 formed of a metal and disposed between the deck 14 and the wheels 62, 64 for providing rigidity to the housing structure 12 of the band saw 10. The reinforcement plate 172 includes a drive portion 174 located proximate the drive wheel 62, a driven portion 176 located proximate the driven wheel 64 and a bridge portion 178 extending between the drive and driven portions 174, 176. The drive wheel 62 is positioned adjacent a bottom surface of the drive portion 174 and the driven wheel 64 is positioned adjacent a bottom surface of the driven portion 176. The drive portion 174 is secured to the gear box 18 by fasteners such as screws (not shown). The gear box 18 is, in turn, fastened to the deck 14. The driven portion 176 is fastened to the deck 14 by fasteners, such as screws (not shown). The drive portion 174 includes an aperture 180 for receiving the drive wheel axle 68 therethrough, and the driven portion 176 includes a slot 182 for receiving the driven wheel axle 72 therethrough and accommodating movement of the driven wheel axle 72 as a result of the tensioning mechanism 78.

Figure 14:
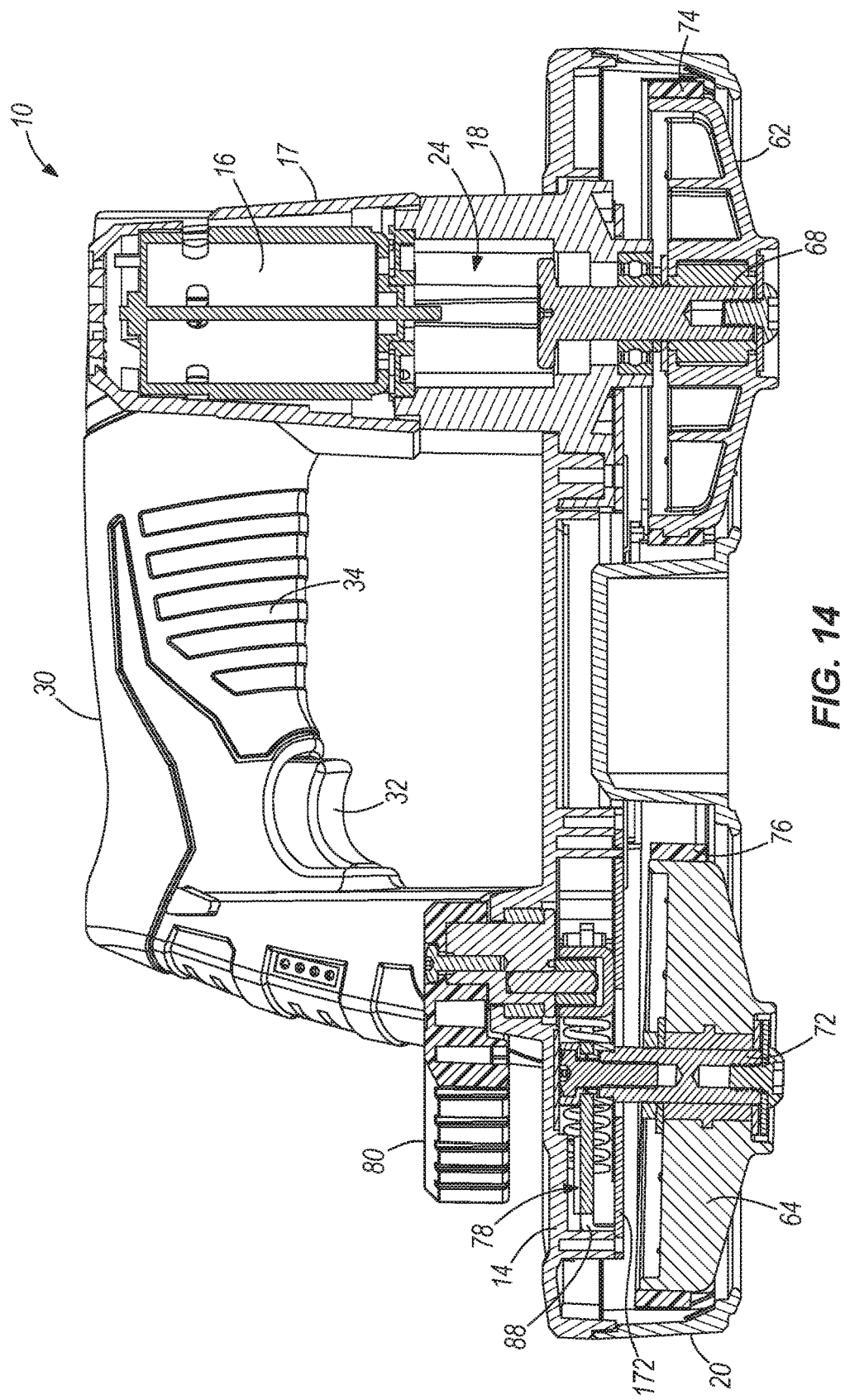
FIG. 14 is a cross section of the band saw of FIG. 3 taken along line 14-14.
Figure 15:
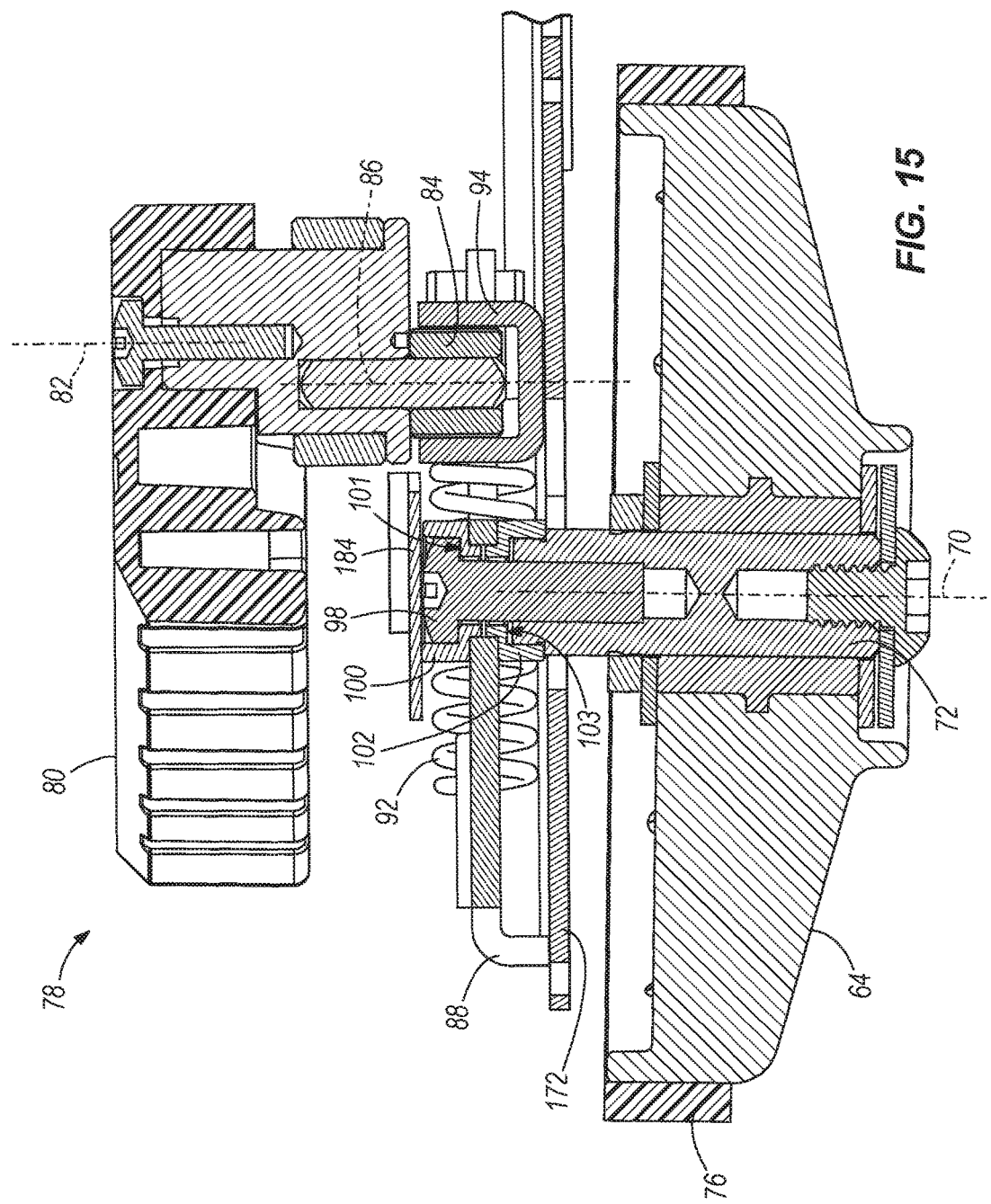
FIG. 15 is an enlarged view of a portion of the cross section of FIG. 14.
Figure 16:
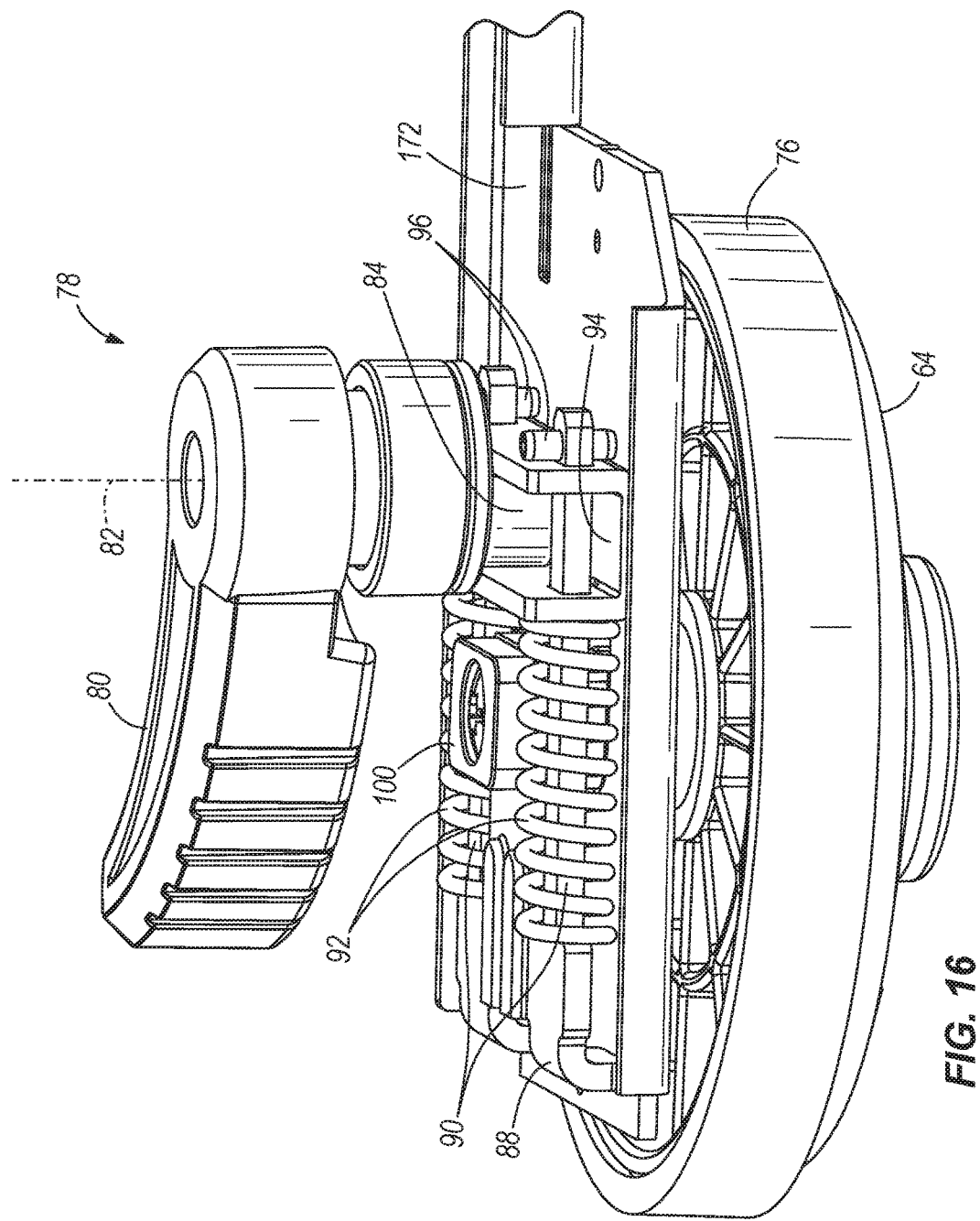
FIG. 16 is a perspective view of a tensioning mechanism of the band saw shown in FIG. 1.

The tensioning mechanism 78 is trapped in a space between the driven portion 176 of the reinforcement plate 172 and an inner surface of the deck 14. With reference to FIGS. 14 and 15, a distal end of the spring guide 88 abuts the reinforcement plate 172 to inhibit the tensioning mechanism 78 from tilting in a first direction, and the tilting block 100 bears against a metal insert 184, which is coupled to the deck 14 (FIG. 13) to inhibit the tensioning mechanism 78 from tilting in a second direction opposite the first direction. Thus, the tensioning mechanism 78 is trapped between the reinforcement plate 172 and the guard 14.

In operation of the band saw 10, an operator grips the grip portion 34 of the handle 30 with one hand and actuates the trigger 32 with the same hand. Actuation of the trigger 32 causes the motor 16 and drive assembly 24 to rotate the drive wheel 62 about the drive wheel axis 66, causing motion of the band saw blade 26 for cutting the workpiece 28 in the cut zone 44. Because the grip portion 34 is positioned at least partially between the first and second planes 46, 48 bounding the cut zone 44, or opening 38, the operator's hand is also positioned between the first and second planes 46, 48 during the cutting operation. The bridge 104 limits movement of the workpiece 28 after the cutting operation is complete. Furthermore, the guard 20 protects the cutting edge 114 of the blade 28 when the cutting edge 114 is not positioned in the cut zone 44.

Thus, the invention provides, among other things, a compact band saw having a workpiece guard and a blade guard. Various features and advantages of the invention are set forth in the following claims.

What is claimed is:

1. A method of manufacturing a band saw comprising:
providing a deck;
coupling first and second wheels to the deck for rotation about respective first and second wheel axes and for receiving a continuous blade thereabout;
coupling a motor to the deck for driving at least one of the first or second wheels;
providing a handle for a user to hold the band saw;
providing a blade guard having a first portion adjacent the first wheel and a second portion adjacent the second wheel, wherein the blade guard is movable with respect to the deck between a closed position and an open position;

fixing the first and second portions to each other;

hingedly coupling the first and second portions to the deck for simultaneous movement with respect to the deck;

providing a first deck lip extending from the deck proximate the first wheel, and providing a second deck lip extending from the deck proximate the second wheel, the first and second deck lips projecting away from the deck;

providing a first guard lip extending from the blade guard proximate the first portion, and providing a second guard lip extending from the blade guard proximate the second portion, the first and second guard lips projecting away from the blade guard in a direction substantially perpendicular to at least one of the first or second wheel axes, such that the first guard lip is generally parallel and adjacent to the first deck lip in the closed position, and such that the second guard lip is generally parallel and adjacent to the second deck lip in the closed position; and providing a first cantilevered spring arm configured to couple the first portion to the deck when the first guard lip is generally parallel and adjacent to the first deck lip, and providing a second cantilevered spring arm configured to couple the second portion to the deck when the second guard lip is generally parallel and adjacent to the second deck lip.

2. The method of claim 1, further comprising providing a first latch coupling the first portion to the deck and a second latch coupling the second portion to the deck for coordinated latching of the first and second portions with respect to the deck.

3. The method of claim 2, wherein providing the first latch includes providing the first cantilevered spring arm and wherein providing the second latch includes providing the second cantilevered spring arm.

4. The method of claim 2, wherein providing the first and second latches includes providing a first member and a second member each overlapping a respective one of the first and second guard lips on the blade guard.

5. The method of claim 1, further comprising providing a latch coupling at least one of the first or second portions to the deck.

6. The method of claim 1, wherein hingedly coupling includes providing substantially coaxial barrel sections between the first portion and the deck and between the second portion and the deck, respectively.

7. The method of claim 1, further comprising:

providing the blade guard with a substantially straight edge extending from the first portion to the second portion; and forming the substantially straight edge to extend across at least a portion of the first portion, across substantially an entire length of an intermediate portion between the first and second portions, and across at least a portion of the second portion;

wherein hingedly coupling includes coupling the blade guard to the deck at the substantially straight edge such that the first, second, and intermediate portions are hinged along a single axis.

8. The method of claim 7, further comprising forming a generally semi-circular edge on each of the first and second portions, wherein the substantially straight edge extends between the generally semi-circular edges.

9. A hand-held band saw for cutting a workpiece, the hand-held band saw comprising:

a deck;

first and second wheels coupled to the deck for receiving a continuous blade thereabout, the first and second wheels being rotatably mounted about first and second wheel axes respectively;

a motor coupled to the deck for driving at least one of the first or second wheels;

a handle providing a grip for a user to hold the band saw;

a blade guard having a first portion adjacent the first wheel, a second portion adjacent the second wheel, and a third portion adjoining the first and second portions, wherein the blade guard is movable with respect to the deck between a closed position and an open position;

a joint coupling the first, second, and third portions to the deck for simultaneous movement of the first, second, and third portions with respect to the deck;

a first deck lip extending from the deck proximate the first wheel, and a second deck lip extending from the deck proximate the second wheel, the first and second deck lips projecting away from the deck;

a first guard lip extending from the blade guard proximate the first portion, and a second guard lip extending from the blade guard proximate the second portion, the first and second guard lips projecting away from the blade guard in a direction substantially perpendicular to at least one of the first or second wheel axes; and a first cantilevered spring arm configured to couple the first portion to the deck in the closed position, and a second cantilevered spring arm configured to couple the second portion to the deck in the closed position;

wherein the first guard lip is generally parallel and adjacent to the first deck lip in the closed position, and wherein the second guard lip is generally parallel and adjacent to the second deck lip in the closed position.

10. The hand-held band saw of claim 9, further comprising a first latch coupling the first portion to the deck and a second latch coupling the second portion to the deck for coordinated latching of the first and second portions with respect to the deck.

11. The hand-held band saw of claim 10, wherein the first latch includes the first cantilevered spring arm and the second latch includes the second cantilevered spring arm.

12. The hand-held band saw of claim 10, wherein each of the first and second latches includes a member that overlaps a respective one of the first and second guard lips on the blade guard.

13. The hand-held band saw of claim 9, further comprising a latch coupling at least one of the first or second portions to the deck.

14. The hand-held band saw of claim 9, wherein the joint further comprises substantially coaxial barrel sections between the first portion and the deck and between the second portion and the deck, respectively.

15. The hand-held band saw of claim 9, further comprising:

a substantially straight edge extending from the first portion to the second portion;

wherein the substantially straight edge extends across at least a portion of the first portion, across substantially an entire length of an intermediate portion between the first and second portions, and across at least a portion of the second portion;

wherein the blade guard is coupled to the deck at the substantially straight edge such that the first, second, and intermediate portions are hinged along a single axis.

16. The hand-held band saw of claim 15, further comprising a generally semi-circular edge on each of the first and second portions, wherein the substantially straight edge extends between the generally semi-circular edges.

17. A hand-held band saw for cutting a workpiece, the hand-held band saw comprising:
- a deck defining a front and a rear, the deck having an opening in the front defining a cut zone and a first deck portion generally located on a first side of the opening and a second deck portion generally located on a second side of the opening;
- a first wheel supported by the first deck portion;
- a second wheel supported by the second deck portion, the first and second wheels for supporting a blade and being mounted rotatably about respective first and second wheel axes;
- a motor operably coupled to the first wheel;
- a handle providing a grip for a user to hold the band saw;
- a blade guard configured to provide a barrier between the blade and an exterior of the band saw, wherein the blade guard is movable with respect to the deck between a closed position and an open position; and
- a joint between the blade guard and the deck such that the blade guard is movable with respect to the deck;
- wherein the blade guard includes a first portion adjacent the first wheel, a second portion adjacent the second wheel, and a third portion adjoining the first and second portions such that the first, second, and third portions move as one piece with respect to the deck;
- a first deck lip extending from the deck proximate the first wheel, and a second deck lip extending from the deck proximate the second wheel, the first and second deck lips projecting away from the deck;
- a first guard lip extending from the blade guard proximate the first portion, and a second guard lip extending from the blade guard proximate the second portion, the first and second guard lips projecting away from the blade guard in a direction substantially perpendicular to at least one of the first or second wheel axes, wherein the first guard lip is generally parallel and adjacent to the first deck lip in the closed position, and wherein the second guard lip is generally parallel and adjacent to the second deck lip in the closed position; and
- a first cantilevered spring arm configured to couple the first portion to the deck when the first guard lip is generally parallel and adjacent to the first deck lip, and a second cantilevered spring arm configured to couple the second portion to the deck when the second guard lip is generally parallel and adjacent to the second deck lip.

18. The hand-held band saw of claim 17, wherein the joint is disposed at the rear.

19. The hand-held band saw of claim 17, further comprising:
- a substantially straight edge extending from the first portion to the second portion;
- wherein the substantially straight edge extends across at least a portion of the first portion, across substantially an entire length of the third portion, and across at least a portion of the second portion;
- wherein the joint is coupled to the substantially straight edge such that the first, second, and third portions are hinged along a single axis.

20. The hand-held band saw of claim 19, wherein the first and second portions each include a generally semi-circular edge, wherein the substantially straight edge extends between the generally semi-circular edges.

* * * * *